United States Patent
Kim et al.

(10) Patent No.: US 9,653,758 B2
(45) Date of Patent: May 16, 2017

(54) SURFACE TREATMENT METHOD OF SOLID ELECTROLYTE FOR SODIUM SECONDARY BATTERY

(71) Applicant: SK INNOVATION CO., LTD., Seoul (KR)

(72) Inventors: Young Shol Kim, Daejeon (KR); Ku Bong Chung, Daejeon (KR); Seung Hwan Jo, Daejeon (KR); Jeong Soo Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 97 days.

(21) Appl. No.: 14/827,096

(22) Filed: Aug. 14, 2015

(65) Prior Publication Data
US 2016/0056509 A1    Feb. 25, 2016

(30) Foreign Application Priority Data
Aug. 25, 2014   (KR) .................. 10-2014-0110712

(51) Int. Cl.
*H01M 10/36*   (2010.01)
*H01M 10/39*   (2006.01)

(52) U.S. Cl.
CPC ..... *H01M 10/3918* (2013.01); *H01M 10/399* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 2003/0054255 A1 | 3/2003 | Hidaka et al. | |
| 2014/0127588 A1* | 5/2014 | Kato ............... | H01B 1/122 429/304 |

* cited by examiner

*Primary Examiner* — Jacob Marks
(74) *Attorney, Agent, or Firm* — IP & T Group LLP

(57) ABSTRACT

Provided are a solid electrolyte for a sodium secondary battery, and a surface treatment method thereof, and more specifically, a solid electrolyte for a sodium secondary battery capable of having excellent electrochemical performance by improving wettability with respect to molten sodium, even under a low temperature operation environment of 250° C. or less, and a surface treatment method thereof.

18 Claims, 1 Drawing Sheet

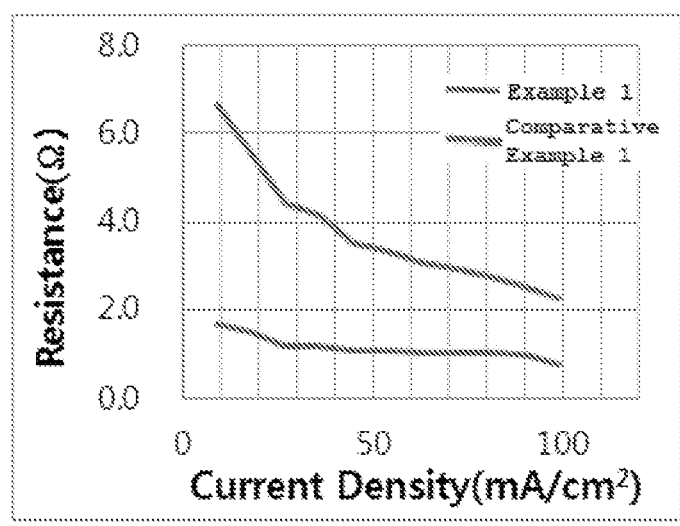

SURFACE TREATMENT METHOD OF SOLID ELECTROLYTE FOR SODIUM SECONDARY BATTERY

CROSS-REFERENCE TO RELATED APPLICATIONS

This application claims priority under 35 U.S.C. §119 to Korean Patent Application No. 10-2014-0110712, filed on Aug. 25, 2014, in the Korean Intellectual Property Office, the disclosure of which is incorporated herein by reference in its entirety.

TECHNICAL FIELD

The following disclosure relates to a surface treatment method of a solid electrolyte for a sodium secondary battery, and more specifically, to a surface treatment method of a solid electrolyte for a sodium secondary battery in which wettability with respect to molten sodium at a low temperature is improved.

BACKGROUND

As a use of renewable energy rapidly increases, a need for an energy storage device using a battery rapidly increases. As the battery, a lead battery, a nickel/hydrogen battery, a vanadium battery and a lithium battery may be used. However, the lead battery and the nickel/hydrogen battery have significantly low energy density which is a problem in that a large space is required to store energy having the same capacity. In addition, the vanadium battery has a problem in that environmental pollution is caused by using a solution containing heavy metals, and amounts of anode and cathode materials that are moved through a membrane separating the anode and the cathode are small, which causes deterioration of performance, such that mass-production of the vanadium battery has not been achieved yet. The lithium battery having significantly excellent energy density and output characteristic is technically advantageous. However, it is difficult to be economically used as a secondary battery for large scale power storage due to scarcity of a resource of a lithium material.

To solve this problem, there are a number of attempts to use sodium, which is an abundant resource on earth, as the material of the secondary battery. Among them, a sodium-sulfur battery that uses a solid electrolyte having selective conductivity with respect to sodium ions, and has a form in which an anode is supported with sodium, and a cathode is supported with sulfur, or a sodium-transition metal halide battery that uses a solid electrolyte having selective conductivity with respect to sodium ions, and has a form in which an anode is supported with sodium, and a nickel (Ni) cathode is supported with a molten sodium cathode solution containing sodium salt and NaAlCl$_4$ has been used as a device for large scale energy storage, as described in U.S. Patent Application Publication No. 20030054255.

However, the solid electrolyte used in the sodium secondary battery has a problem in that resistance is increased due to low wettability with respect to molten sodium at a temperature of 250° C. or less, to deteriorate battery efficiency.

In particular, the low wettability of the solid electrolyte that separates the cathode and the anode requires a larger amount of active materials, which causes an increase of battery cost and deterioration of battery performance.

RELATED ART DOCUMENT (Patent Document 1) U.S. Patent Application Publication No. 20030054255

SUMMARY

An embodiment of the present disclosure is directed to providing a surface treatment method of a solid electrolyte for a sodium secondary battery in which wettability with respect to molten sodium is improved even under a low temperature operation environment, a solid electrolyte for the sodium secondary battery, and a sodium secondary battery manufactured by the solid electrolyte for the sodium secondary battery.

In one general aspect, a surface treatment method of a solid electrolyte for a sodium secondary battery, includes: a first step of preparing a polymer solution obtained by polymerizing a first hydrocarbon-based binder having a hydroxyl group in a molecular structure and a second hydrocarbon-based binder having an amine group in the molecular structure, wherein the polymerizing of the first hydrocarbon-based binder and the second hydrocarbon-based binder is performed by adding an acid catalyst to a mixed solution including the first hydrocarbon-based binder, the second hydrocarbon-based binder, and a pore-forming agent; a second step of forming a polymer film by coating the polymer solution onto one region of a surface of a sodium ion conductive solid electrolyte; and a third step of forming a porous carbon coating layer by carbonizing the polymer film.

The sodium ion conductive solid electrolyte may be beta alumina or NASICON.

The carbon coating layer of the solid electrolyte may contact molten sodium of the sodium secondary battery.

The first hydrocarbon-based binder may be a compound represented by Chemical Formula 1 below:

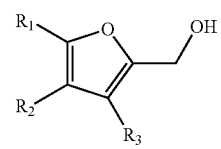

[Chemical Formula 1]

in Chemical Formula 1,
R$_1$ to R$_3$ are each independently hydrogen or (C1~C4) alkyl.

The second hydrocarbon-based binder may be represented by Chemical Formula 2 below:

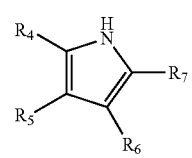

[Chemical Formula 2]

in Chemical Formula 2,
R$_4$ to R$_7$ are each independently hydrogen or (C1~C4) alkyl.

The mixed solution of step 1 may contain 20 to 35 parts by weight of the second hydrocarbon-based binder and 30 to 70 parts by weight of the pore-forming agent, in relation to 100 parts by weight of the first hydrocarbon-based binder.

The acid catalyst of step 1 may have a content of 0.1 to 2.0 parts by weight, in relation to 100 parts by weight of the first hydrocarbon-based binder.

The polymerizing of step 1 may be performed at a temperature between −20 to 110° C.

The coating of step 2 may foe performed by coating the polymer solution having a coating amount within a range of 0.01 to 0.5 g/cm$^2$.

The carbonizing of step 3 may be performed under an inert atmosphere within a range of 300 to 600° C.

In another general aspect, there is provided a solid electrolyte surface-treated with a carbon coating layer having a porosity of 0.01 to 0.3 cm$^3$/g$_{carbon}$.

The cartoon coating layer may be an amorphous carbon, a crystalline carbon or mixtures thereof, The solid electrolyte may have selective permeability only with respect to sodium ions, and may have impermeability to anions.

Ionic conductivity with respect to the sodium ions of the solid electrolyte may have a range of 20 to 400 mS/cm$^2$ at 90 to 200° C.

In another general aspect, there is provided a sodium secondary battery including the solid electrolyte as described above.

The sodium secondary battery may include an anode containing sodium; a molten sodium contacting the carbon coating layer of the solid electrolyte; and a cathode.

The cathode may contain a transition metal and/or a transition metal halide.

The cathode may be impregnated with a cathode solution containing a halide in which a halide containing sodium and a halide containing aluminum achieve a eutectic point; a sodium salt; or mixtures thereof, and the sodium salt may contain a halide containing a hydroxide, a borate or a phosphate.

BRIEF DESCRIPTION OF THE DRAWINGS

FIG. 1 shows evaluation results of properties of sodium secondary batteries manufactured by Example 1 and Comparative Example 1.

DETAILED DESCRIPTION OF EMBODIMENTS

Hereinafter, a surface treatment method of a solid electrolyte for a sodium secondary battery according to the present disclosure will be described in detail. The drawings to be described below are provided by way of example so that the idea of the present disclosure can be sufficiently transferred to those skilled in the art to which the present disclosure pertains. Therefore, the present disclosure may be specified in many different forms, without being limited to the drawings to be described below. The drawings may be exaggerated and shown in order to specify the spirit of the present disclosure.

Here, unless technical and scientific terms used herein are defined, otherwise, they have meanings understood by those skilled in the art to which the present disclosure pertains. Known functions and components which obscure the gist of the present disclosure in the following description and the accompanying drawings will be omitted.

Term "pore-forming agent" in the present specification is a material that functions as a template for a material to be synthesized to induce porosity, and may be used as the same meaning as a structure-directing agent, or a structural derivative commonly used in the art.

The present disclosure provides a surface treatment method of a solid electrolyte for a sodium secondary battery, including: a first step of preparing a polymer solution obtained by polymerizing a first hydrocarbon-based binder having a hydroxyl group in a molecular structure and a second hydrocarbon-based binder having an amine group in the molecular structure, wherein the polymerizing of the first hydrocarbon-based binder and the second hydrocarbon-based binder is performed by adding an acid catalyst to a mixed solution including the first hydrocarbon-based binder, the second hydrocarbon-based binder, and a pore-forming agent; a second step of forming a polymer film by coating the polymer solution onto one region of a surface of a sodium ion conductive solid electrolyte; and a third step of forming a porous carbon coating layer by carbonizing the polymer film.

In the surface treatment method of the solid electrolyte for a sodium secondary battery according to an exemplary embodiment of the present disclosure, the polymer solution may be prepared by polymerizing the first hydrocarbon-based binder having a hydroxyl group in a molecular structure and the second hydrocarbon-based binder having an amine group in the molecular structure, and the polymer solution may nave excellent adhesion with respect to a substrate due to an electrostatic function and a polar interaction.

In preparing the polymer solution according to an exemplary embodiment of the present disclosure, modification of composition ratio of various binders and processing conditions were attempted to improve adhesion with respect to the solid electrolyte, and the polymer solution may be prepared by polymerizing the first hydrocarbon-based binder having a hydroxyl group in the molecular structure and the second hydrocarbon-based binder having an amine group in the molecular structure according to the present disclosure. The solid electrolyte according to the present disclosure is a solid electrolyte including the carbon coating layer manufactured by using the polymer solution to form a polymer film on one region of the sodium ion conductive solid electrolyte, and then carbonizing the polymer film. Accordingly, it was confirmed that the solid electrolyte according to the present disclosure includes the carbon coating layer manufactured by the method to have remarkably improved wettability with respect to molten sodium as compared to the existing solid electrolyte, and more specifically, it was confirmed that wettability with respect to molten sodium was excellent even under a low temperature operation environment.

The first hydrocarbon-based binder having a hydroxyl group in the molecular structure and the second hydrocarbon-based binder having an amine group in the molecular structure are monomer materials having adhesion with respect to a substrate, and the polymer solution prepared by polymerizing the first hydrocarbon-based binder and the second hydrocarbon-based binder may exhibit remarkable adhesion as compared to adhesion as the monomer, and may be applied to a large area of a tube typed, stack typed, or folding typed sodium secondary battery due to excellent adhesion.

In the case of the large area of tube typed, stack typed, or folding typed sodium secondary battery, when wettability of the solid electrolyte with respect to the molten sodium is low, a portion in which an electrolyte is sufficiently wet, and a portion in which the electrolyte is not sufficiently wet may be present, which may function as a reason for causing deterioration of battery performance. Accordingly, in order to solve the above-described problems, in the solid electrolyte including the carbon coating layer according to the present disclosure, a solution containing the polymer having excellent adhesion with respect to a substrate is applied to one region of the surface of the solid electrolyte, such that uniform coating may be performed even over a large area of the tube typed, stack typed, or folding typed sodium secondary battery. In addition, the solid electrolyte including the carbon coating layer obtained by carbonizing the polymer film may improve impregnation ability or wettability over the large area of a tube typed, stack typed, or folding typed sodium secondary battery.

The sodium ion conductive solid electrolyte used in the surface treatment method of a solid electrolyte for a sodium secondary battery according to an exemplary embodiment of the present disclosure may be a solid electrolyte having selective conductivity to sodium ions used in a general sodium secondary battery. Specific examples of the sodium ion conductive solid electrolyte may be sodium (Na) super ionic conductor (NaSICON) or beta alumina. Examples of the sodium super ionic conductor may include Na—Zr—Si—O-based composite oxide, Na—Zr—Si—P—O-based composite oxide, Y-doped Na—Zr—Si—P—O-based composite oxide, Fe-doped Na—Zr—Si—P—O-based composite oxide or mixtures thereof. Substantial examples of sodium super ionic conductor may include Y or Fe-doped $Na_3Zr_2Si_2PO_{12}$, Y or Fe-doped $Na_{1+x}SiXZr_2P_3-xO_{12}$ (1.6<x<2.4), or mixtures thereof, but the present disclosure is not limited thereto.

According to an exemplary embodiment of the present disclosure, the carbon coating layer of the solid electrolyte may contact the molten sodium of the sodium secondary battery, and due to the carbon coating layer surface-treated by the above-described method, the solid electrolyte may secure chemical stability even under a low temperature condition, and may secure wettability with respect to molten sodium.

Here, the first hydrocarbon-based binder that is a carbon precursor used to form the carbon coating layer may be a compound represented by Chemical Formula 1 below with a hydroxyl group in a molecular structure:

[Chemical Formula 1]

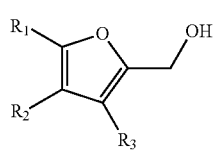

in Chemical Formula 1,
$R_1$ to $R_3$ are each independently hydrogen or (C1~C4) alkyl.

In addition, the second hydrocarbon-based binder may be a compound represented by Chemical Formula 2 below with an amine group in a molecular structure:

[Chemical Formula 2]

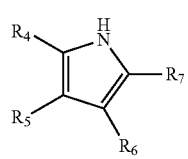

in Chemical Formula 2,
$R_4$ to $R_7$ are each independently hydrogen or (C1~C4) alkyl.

The mixed solution of step 1 may contain 20 to 35 parts by weight of the second hydrocarbon-based binder and 30 to 70 parts by weight of the pore-forming agent, in relation to 100 parts by weight of the first hydrocarbon-based binder. A ratio between the first hydrocarbon-based binder and the second hydrocarbon-based binder may be appropriately controlled within the above-described range according to kinds of the molten sodium, and preferably, the mixed solution of step 1 may contain 26 to 31 parts by weight of the second hydrocarbon-based binder and 45 to 51 parts by weight of the pore-forming agent, in relation to 100 parts by weight of the first hydrocarbon-based binder in order to improve wettability under a low temperature operation environment.

In addition, at the time of forming the carbon coating layer, the pore-forming agent may form the carbon coating layer with porous pores, to provide a flow path for an electrolyte, thereby improving wettability of the solid electrolyte.

The polymer solution according to an exemplary embodiment of the present disclosure may be polymerized by adding an acid catalyst. Specific examples of the acid catalyst used herein may include hydrochloric acid, sulfuric acid, nitric acid, acetic acid or mixtures thereof, but the present disclosure is not limited thereto.

In addition, the polymerizing of step 1 may be performed at a temperature of −20 to 110° C., and may be appropriately controlled under a temperature condition within the above-described range according to a polymer polymerization degree to be desired.

In the manufacturing method of the solid electrolyte for a sodium secondary battery according to an exemplary embodiment of the present disclosure, the coating of step 2 may be performed by coating the polymer solution having a coating amount within a range of 0.01 to 0.5 g/cm², or by coating the polymer solution having a coating amount within a range of 0.01 to 0.2 g/cm², in relation to a carbon (C) content in the polymer of the polymer solution to form a polymer film, wherein the coating may be formed by general methods such as slurry application, coating or deposition according to an idea of the present disclosure.

In the surface treatment method of a solid electrolyte for a sodium secondary battery according to an exemplary embodiment of the present disclosure, a polymer film coated on one region of a surface of the sodium ion conductive solid electrolyte in step 3 may be carbonized to form the carbon coating layer. Here, the carbonizing is preferably performed under an inert gas atmosphere of nitrogen ($N_2$), helium (He), argon (Ar), and the like, or vacuum, and a carbonization temperature preferably has a range of 300 to 600° C., more preferably, has a range of 400 to 550° C.

In addition, the method of forming the carbon coating layer may be affected by uniformity of the polymer film and whether or not an interfacial adhesion is present. According to an exemplary embodiment of the present disclosure, the polymer solution prepared by polymerizing the first hydrocarbon-based binder and the second hydrocarbon-based binder and the pore-forming agent are used to form the polymer film which is a carbon film, on the surface of the sodium ion conductive solid electrolyte, and the polymer film is carbonized to manufacture the solid electrolyte including the carbon coating layer formed therein, such that the porous carbon coating layer having uniform thickness and uniform pores may be manufactured. The carbon coating layer formed by the above-described manufacturing method according to an exemplary embodiment of the present disclosure may be manufactured by a simple and easy manufacturing method, and the solid electrolyte including the carbon coating layer manufactured by the manufacturing method has excellent wettability with respect to molten sodium even at a low temperature process of 250° C. or less.

The present disclosure provides a solid electrolyte surface-treated with a carbon coating layer having a porosity of 0.01 to 0.3 $cm^3/g_{carbon}$.

In the solid electrolyte, the carbon coating layer may be an amorphous carbon, a crystalline carbon or mixtures thereof.

It is known that a contact angle of the molten sodium with respect to the solid electrolyte made of a ceramic material at 265° C. has a 128 degrees significantly bad wettability. Accordingly, a reaction area of the solid electrolyte that sodium ions are capable of being actually transferred from sodium in a battery reaction becomes significantly small. The significantly small reaction area may be one of the main reasons in which resistance of the sodium secondary battery is increased, and as a solution for reducing the resistance, it is required to improve wettability of the solid electrolyte with respect to the molten sodium.

Regarding this, the present inventors found that the solid electrolyte manufactured by using the above-described surface treatment method of the solid electrolyte for a sodium secondary battery according to the present disclosure was capable of having selective permeability to sodium, ions, having impermeability to anions, and having remarkable wettability even under a low temperature operation environment of 250° C.

Here, the crystalline carbon may be at least one selected from the group consisting of a diamond, a graphite, CPT and OLD, but the present disclosure is not limited thereto. In addition, in the solid electrolyte according to the present disclosure, the sodium ions are possible to be moved (penetrated), but the anions are not moved (penetrated), and it is preferable to provide the carbon coating layer having an amorphous carbon form in order to secure thermal chemical stability.

Further, the solid electrolyte may be a film through which anions are not penetrated while simultaneously penetrating sodium ions, and more specifically, the carbon coating layer may have permeability to sodium or sodium ions.

Here, the permeability with respect to sodium ions may mean a property in which when chemical, electrical, or electrochemical moving force is provided to the sodium ions, with the carbon coating layer interposed therebetween, sodium and sodium ions are penetrated through the carbon coating layer and moved.

In the solid electrolyte for a sodium secondary battery manufactured by the above-described surface treatment method of the solid electrolyte for a sodium secondary battery, the anions are ions having negative charges, and may include ions having negative charge produced by a sodium salt contained in order to improve conductivity of the sodium ions in a molten sodium cathode solution provided in a cathode space. Substantially, the anions may include one or two or more ions selected from the group consisting of $OH^-$, $BO^{3-}$, $PO_4^{3-}$, $Cl^-$, $I^-$, $F^-$ and $Br^-$, but the present disclosure is not limited thereto.

In addition, ion conductivity (permeability) to the sodium ions was measured by a 4-point probe method, and the ion conductivity of the solid electrolyte may have a range of 20 to 400 $mS/cm^2$ at 90 to 200° C.

As one more substantial example, sodium secondary batteries may be manufactured by using a solid electrolyte including carbon coating layers formed on both surfaces, a solid electrolyte including a carbon coating layer formed on one surface, and a solid electrolyte in which carbon coating layers are not formed on both surfaces, and then sodium (Na/NaSICON/Na) may be positioned at both sides of the solid electrolyte under a temperature of 160° C. and a sealing pressure of 20 psi, and then, these cells may be configured so that a current of 10 to 100 $mA/cm^2$ flows. Then, the manufactured cells may be compared in view of cell resistance.

In addition, the solid electrolyte manufactured by the above-described surface treatment method of the solid electrolyte for a sodium secondary battery may have a porous carbon coating layer having a porosity of 0.01 to 0.3 $cm^3/g$, and due to the porosity having the above-described range, a surface area contacting an electrolyte may be remarkably enlarged, and a battery efficiency may be significantly improved.

The present disclosure provides a sodium secondary battery including the solid electrolyte as described above.

The sodium secondary battery according to an exemplary embodiment of the present disclosure may include a cathode space and an anode space which are physically partitioned by the above-described solid electrolyte, wherein in the anode space, an anode containing sodium may be positioned, and in the cathode space, a cathode containing a transition metal and/or a transition metal halide may be impregnated with a cathode solution containing a halide in which a halide containing sodium and a halide containing aluminum achieve a eutectic point; a sodium salt; or mixtures thereof, and the sodium salt may contain a hydroxide, a borate or a phosphate or mixtures thereof.

Here, specific examples of the cathode that is capable of being positioned in the cathode space may include copper, silver, gold, nickel, palladium, platinum, cobalt, rhodium, iridium, iron, manganese, chromium, vanadium or molybdenum, preferably, nickel, copper or iron. The halide of the transition metal may be sodium halide (NaX; X=halogen), but the present disclosure is not limited thereto.

In addition, a specific example of the cathode solution that is capable of being impregnated in the cathode may be a molten salt cathode solution represented by $NaM(X)_4$. Here, M is an element selected from the group consisting of metals and semi-metals having a trivalent oxidation number, X may be selected from halogen elements, more preferably, M may be boron, aluminum, gallium or indium.

In the sodium secondary battery according to an exemplary embodiment of the present disclosure, the anode may be a metal sodium, and a molten sodium. Here, a predetermined portion of a current collector (anode current collector) such as graphite felt may be impregnated with molten sodium.

In the sodium secondary battery according to an exemplary embodiment of the present disclosure, the cathode may include a cathode active material and a current collector coated with the cathode active material. Specifically, the current collector (cathode current collector) may have a form of a metal foam, a metal foil (film), a metal mesh, a metal felt or a porous (perforated) metal film having conductivity, and may include nickel which is a metal of the current collector.

In the sodium secondary battery according to an exemplary embodiment of the present disclosure, the cathode active material may include a transition metal, a halide of the transition metal, or a hydroxide of the transition metal.

Specific examples of the hydroxide of the transition metal may include nickel hydroxide ($Ni(OH)_2$), cobalt hydroxide ($Co(OH)_2$, $Co(OH)_3$), iron hydroxide ($Fe(OH)_2$, $Fe(OH)_3$), manganese hydroxide ($Mn(OH)_2$), aluminum hydroxide ($Al(OH)_{32}$), and the like, but the present disclosure is not limited thereto.

In the sodium secondary battery according to an exemplary embodiment of the present disclosure, the cathode may be a laminate in which an active material layer and a current collector are stacked by coating the cathode active material on at least one surface of the cathode current collector. Here, the active material layer may contain a conductive material and a binder that are generally used in electrodes for a secondary battery, together with the cathode active material.

In the sodium secondary battery according to an exemplary embodiment of the present disclosure, the molten sodium may be an aqueous solution containing a sodium salt or a sodium salt in a molten state, and the sodium salt may include hydroxides, borates, phosphates, halides of sodium, or mixtures thereof. Specifically, the sodium salt may include sodium hydroxide (NaOH), trisodium phosphate ($Na_3PO_4$), sodium pyrophosphate ($Na_2HPO_4$), sodium meta-borate ($NaBO_2$), borax ($Na_2B_4O_7$), boric acid ($H_3BO_3$), or mixtures thereof. Here, the sodium salt may be a hydrated material. The sodium salt contained in the molten sodium may contain the halide containing the hydroxide, borate or phosphate.

Here, in the case of a halide in which a halide containing sodium (hereinafter, referred to as a sodium halide) and a halide containing aluminum (hereinafter, referred to as an aluminum halide) achieve a eutectic point in the cathode solution, the sodium halide and the aluminum halide may be mixed at a molar ratio satisfying a eutectic composition. As a non-limited specific example, the sodium halide may include sodium chloride, and the aluminum halide may include aluminum chloride, and the cathode solution may be prepared by mixing the sodium halide and the aluminum halide at a molar ratio of 1:1.

Although the surface-treated solid electrolyte for a sodium secondary battery and the surface treatment method, thereof according to specific exemplary embodiments of the present disclosure have been described for illustrative purposes, these exemplary embodiments are not intended to limit the protective scope defined by the attached claims of the present disclosure.

EXAMPLE 1

Preparation of sodium secondary battery (Na/NaSICON/Na) using solid electrolyte including carbon coating layers formed on both surfaces.

56 g of furfuryl alcohol as a first hydrocarbon-based binder, 28 g of pyrrole as a second hydrocarbon-based binder, and 27 g of poly ethylene glycol monoethylether as a pore-forming agent were added to prepare a mixed solution. 0.5 g of nitric acid having 70% concentration as an acid catalyst was added to the mixed solution, and stirred at 30° C. temperature condition for 0.5 hours to thereby prepare a polymer solution in which the first hydrocarbon-based binder and the second hydrocarbon-based binder were polymerized. The polymer solution having a coating amount of 0.4 $g/cm^2$ was coated on both surfaces of the surface of NASICON which was a sodium ion conductive solid electrolyte to thereby form a polymer film. The manufactured polymer film, was carbonized at 500° C. temperature condition to manufacture a solid electrolyte including porous carbon coating layers.

The manufactured solid electrolyte was positioned in the center of U-shaped cell, and 10 g of sodium was positioned on both surfaces to thereby manufacture a sodium secondary battery (Na/NaSICON/Na) by known methods.

COMPARATIVE EXAMPLE 1

Preparation of sodium secondary battery (Na/NaSICON/Na) using solid electrolyte in which carbon coating layers are not formed on both surfaces.

Non-treated NASICON which was a sodium ion conductive solid electrolyte was positioned in the center of U-shaped cell, and 10 g of sodium was positioned on both surfaces to thereby manufacture a sodium secondary battery (Na/NaSICON/Na) by known methods.

Sodium secondary batteries (Na/NaSICON/Na) were manufactured by Example 1 and Comparative Example 1, and properties of the manufactured cells were evaluated under conditions of a temperature of 160° C., sealed pressure of 20 psi, and current of 10 to 100 $mA/cm^2$. As a result, as shown in FIG. 1, it could be confirmed that the sodium secondary battery using the solid electrolyte including the carbon coating layers formed on both surfaces according to the present disclosure (Example 1), change in cell resistance according to change in density of current was small, but it was confirmed that the sodium secondary battery using the solid electrolyte in which the carbon coating layers were not formed on both surfaces (Comparative Example 1), change in cell resistance according to change in density of current was large.

The solid electrolyte for a sodium secondary battery according to the present disclosure may improve wettability with respect, to molten sodium even under a low temperature operation environment of 250° C. or less, thereby reducing cell resistance and significantly improving performance of the sodium secondary battery.

In addition, when the surface treatment method of the solid electrolyte for a sodium secondary battery according to the present disclosure is used, a small amount of active material may be used to achieve the same performance which reduces production cost.

Hereinabove, although the present disclosure is described by specific matters, limited exemplary embodiments, and drawings, they are provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should, not be limited to the above-described exemplary embodiments, and the following claims as well as all modified, equally or equivalently to the claims are intended to fall within the scopes and spirit of the disclosure.

What is claimed is:

1. A surface treatment method of a solid electrolyte for a sodium secondary battery, comprising:
   a first step of preparing a polymer solution obtained by polymerizing a first hydrocarbon-based binder having a hydroxyl group in a molecular structure and a second, hydrocarbon-based binder having an amine group in the molecular structure, wherein the polymerizing of the first hydrocarbon-based binder and the second hydrocarbon-based binder is performed by adding an acid catalyst to a mixed solution including the first hydrocarbon-based binder, the second, hydrocarbon-based binder, and a pore-forming agent;

a second step of forming a polymer film by coating the polymer solution onto one region of a surface of a sodium ion conductive solid electrolyte; and a third step of forming a porous carbon coating layer by carbonizing the polymer film.

2. The surface treatment method of claim 1, wherein the sodium ion conductive solid electrolyte is beta alumina or NASICON.

3. The surface treatment method of claim 1, wherein the carbon coating layer contacts molten sodium of the sodium secondary battery.

4. The surface treatment method of claim 1, wherein the first hydrocarbon-based binder is represented by Chemical Formula 1 below:

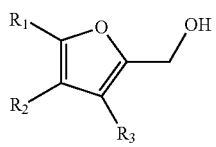

[Chemical Formula 1]

in Chemical Formula 1, $R_1$ to $R_3$ are each independently hydrogen or (C1~C4) alkyl.

5. The surface treatment method of claim 4, wherein the second hydrocarbon-based binder is represented by Chemical Formula 2 below:

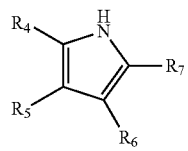

[Chemical Formula 2]

in Chemical Formula 2, $R_4$ to $R_7$ are each independently hydrogen or (C1~C4) alkyl.

6. The surface treatment method of claim 5, wherein the mixed solution of step 1 contains 20 to 35 parts by weight of the second hydrocarbon-based binder and 30 to 70 parts by weight of the pore-forming agent, in relation to 100 parts by weight of the first hydrocarbon-based binder.

7. The surface treatment method of claim 6, wherein the acid catalyst of step 1 has a content of 0.1 to 2.0 parts by weight, in relation to 100 parts by weight of the first hydrocarbon-based binder.

8. The surface treatment method of claim 1, wherein the polymerizing of step 1 is performed at a temperature between −20 to 110° C.

9. The surface treatment method of claim 1, wherein the coating of step 2 is performed by coating the polymer solution having a coating amount within a range of 0.01 to 0.5 g/cm².

10. The surface treatment method of claim 1, wherein the carbonizing of step 3 is performed under an inert atmosphere within a range of 300 to 600° C.

11. A solid electrolyte surface-treated with a carbon coating layer having a porosity of 0.01 to 0.3 $cm^3/g_{carbon}$.

12. The solid electrolyte of claim 11, wherein the carbon coating layer is an amorphous carbon, a crystalline carbon or mixtures thereof.

13. The solid electrolyte of claim 12, wherein the solid electrolyte has permeability with respect to sodium ions, and has impermeability with respect to anions.

14. The solid electrolyte of claim 13, wherein ionic conductivity with respect to the sodium ions of the solid electrolyte has a range of 20 to 400 mS/cm² at 90 to 200° C.

15. A sodium secondary battery including the solid electrolyte of claim 11.

16. The sodium secondary battery of claim 15, wherein the sodium secondary battery includes an anode containing sodium; a molten sodium contacting the carbon coating layer of the solid electrolyte; and a cathode.

17. The sodium secondary battery of claim 16, wherein the cathode contains a transition metal and/or a transition metal halide.

18. The sodium secondary battery of claim 17, wherein the cathode contains a halide in which a halide containing sodium and a halide containing aluminum, achieve a eutectic point; a sodium salt; or mixtures thereof, and the sodium salt contains a halide containing a hydroxide, a borate or a phosphate.

* * * * *